United States Patent
Zhang et al.

(10) Patent No.: US 8,306,283 B2
(45) Date of Patent: Nov. 6, 2012

(54) FOCUS ENHANCING METHOD FOR PORTRAIT IN DIGITAL IMAGE

(75) Inventors: Hua-Qi Zhang, Hangzhou (CN); Min Cheng, Hangzhou (CN); Guang-Yan Liu, Hangzhou (CN); Fan-Tao Zeng, Hangzhou (CN); Jin Wang, Hangzhou (CN)

(73) Assignee: Arcsoft (Hangzhou) Multimedia Technology Co., Ltd., Hangzhou (CN)

( * ) Notice: Subject to any disclaimer, the term of this patent is extended or adjusted under 35 U.S.C. 154(b) by 859 days.

(21) Appl. No.: 12/385,809

(22) Filed: Apr. 21, 2009

(65) Prior Publication Data

US 2010/0266207 A1    Oct. 21, 2010

(51) Int. Cl.
*G06K 9/62* (2006.01)
(52) U.S. Cl. .................. 382/118; 382/173; 382/255
(58) Field of Classification Search .................. None
See application file for complete search history.

(56) References Cited

U.S. PATENT DOCUMENTS

| | | | |
|---|---|---|---|
| 2007/0003154 A1* | 1/2007 | Sun et al. | 382/254 |
| 2007/0041640 A1* | 2/2007 | Tabata et al. | 382/173 |
| 2008/0259154 A1* | 10/2008 | Garrison et al. | 348/14.01 |

* cited by examiner

Primary Examiner — Brian P Werner
(74) Attorney, Agent, or Firm — Bacon & Thomas, PLLC

(57) ABSTRACT

A focus enhancing method for a portrait in a digital image is applied to an electronic device capable of receiving or reading a digital image and executing a focus enhancing process with respect to a portrait in the digital image, wherein the focus enhancing process includes a foreground definition procedure for defining a head region and a body region of the portrait as a foreground of the digital image, a foreground and background segmentation procedure for cutting away an image other than the foreground from the digital image and defining the result as a background of the digital image, and a foreground and background blending procedure for blurring the background, feathering a transition region coupled to the foreground and the background, and blending the foreground, the transition region and the background to form a new digital image with a prominent portrait.

4 Claims, 4 Drawing Sheets

FOCUS ENHANCING METHOD FOR PORTRAIT IN DIGITAL IMAGE

FIELD OF THE INVENTION

The present invention relates to a digital image processing method, and more particularly to a method applied in an electronic device capable of receiving or reading a digital image and executing a focus enhancing process with respect to a portrait in the digital image to form a new digital image with a prominent portrait.

BACKGROUND OF THE INVENTION

In recent years, digital image technologies advance rapidly, and various digital image capturing devices (such as CCD and CMOS) of electronic imaging devices (such as digital cameras, digital camcorders, notebook computers, mobile phones and webcams, etc) are introduced to the market. Not only the imaging quality becomes increasingly higher, but the size of the products also becomes increasingly smaller. As the price is getting lower and lower, these digital imaging devices become more popular. Although many digital imaging devices have come with advanced auto focus and auto exposure functions, yet the electronic imaging devices still determine whether or not to capture an image based on information obtained from the detection of a whole scene. A human face only occupies a small portion of the whole scene, and thus it is difficult for a novice photographer to capture a satisfactory portrait (including a head and an upper body) without having the capability and experience of adjusting shutter and diaphragm correctly.

To provide a smart image capturing function for electronic imaging devices and a high-quality portrait photography for consumers, some manufacturers apply a face detection technique to modern electronic image capturing devices, and different face detection algorithms are disclosed in publications, and the most popular one of the face detection algorithms relates to a face detector designed with the Gentle Adaboost (GAB) algorithm, and the face detector uses Haar-like features for identifying a face and bases on a specific quantity of face image samples to train a face classifier to determine whether or not an image in a digital image is a face, adjusting the focal length of the face in the digital image, automatically adjusting a shutter and a diaphragm according to the focal length, and automatically adjusting the shutter and the diaphragm to obtain a digital image with a clear face. Since a low-end electronic image capturing device available in the market generally comes with the auto focus function for automatically adjusting the shutter and diaphragm, therefore users cannot adjust the shutter and diaphragm manually to set a required depth of field for the foreground and background of the digital image and obtain a digital image with a clear foreground (such as a portrait) and a blurred background in order to avoid the unimportant background from spoiling or interfering the foreground, and show the features and importance of the foreground prominently. Although a high-end electronic image capturing device available in the market generally comes with a mechanism for adjusting the shutter and diaphragm manually, users require a certain level of photography knowledge, capability and experience for adjusting the shutter and diaphragm manually to set the depth of field for the foreground and background of the digital image. Obviously, a general user lack of such capability and experience is unable to produce a digital image with clear foreground and background by the high-end electronic image capturing device.

Therefore, it is an important subject for related electronic image capturing device designers and manufacturers to develop an electronic image capturing device with a smart image capturing function to achieve the effects of meeting the basic image capturing requirements of the general users, compensating their insufficient photography skills, effectively saving the long time of making adjustments, and producing a digital image with clear foreground (such as a portrait) and background.

SUMMARY OF THE INVENTION

In view of the shortcomings of the aforementioned conventional electronic image capturing device that is incapable of automatically producing a digital image with clear foreground and background, the inventor of the present invention based on years of experience in the related industry to conduct extensive researches and experiments, and finally designed a focus enhancing method for a portrait in a digital image, in hope of detecting and positioning a portrait in a digital image quickly and effectively, and using the portrait in the digital image as a foreground of the digital image to automatically produce a new digital image with a clear foreground and a blurred background.

Therefore, it is a primary objective of the present invention to provide a focus enhancing method for a portrait in a digital image, and the method is applied to an electronic device capable of receiving or reading a digital image and executing a focus enhancing process with respect to a portrait in the digital image. The method comprises a foreground definition procedure, a foreground and background segmentation procedure and a foreground and background blending procedure. The foreground definition procedure adopts a face detection technique to compute a face position in the digital image, a face feature (including eyes, cheek, jaw and other regions) detection technique to locate a position of the face feature according to the detected face position, and a skin detection technique to correct the face feature according to the skin color to define a head region. The dimension scale of a body region with respect to the head region is used for computing a portrait including the head region and the body region, and the portrait serves as a foreground of the digital image. The foreground and background segmentation procedure adopts a graph cutting technique to cut away an image other than the foreground from the digital image according to the foreground and uses the result as a background of the digital image. The foreground and background blending procedure performs the processes of blurring the background, feathering a transition region coupled to the foreground and the background, such that the transition region can have a smoother and more natural image, and blending the foreground, the transition region and the background to form a new digital image with a prominent portrait.

Another objective of the present invention is to provide a focus enhancing method for a portrait in a digital image, wherein the foreground definition procedure further comprises a head region definition procedure, and the head region definition procedure comprises: defining a face feature region according to a region covered by the face feature; expanding the face feature region by a predetermined dimension scale according to a correction result of the face feature to define a head edge region; and expanding the head edge region by a predetermined dimension scale to define a head transition region.

A further objective of the present invention is to provide a focus enhancing method for a portrait in a digital image, wherein the foreground definition procedure further comprises a body region definition procedure, and the body region definition procedure comprises: defining a body edge region according to the head edge region based on the dimension scale of the body and head regions; and expanding the body edge region to a predetermined dimension scale to define a body transition region.

Another objective of the present invention is to use the head edge region and the body edge region as the foreground, and the head transition region and the body transition region as the transition region between the foreground and the background.

DETAILED DESCRIPTION OF THE PREFERRED EMBODIMENTS

Figure 1:
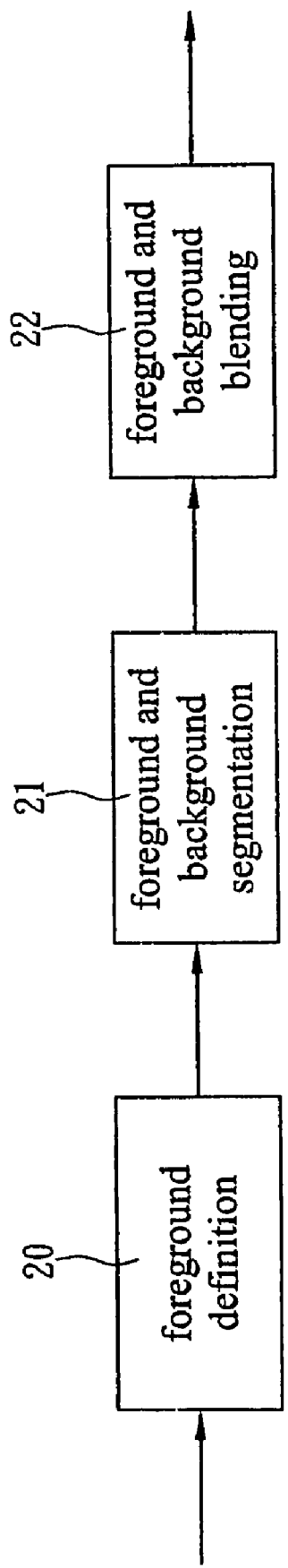
FIG. 1 is a flow chart of a preferred embodiment of the present invention.

The present invention discloses a focus enhancing method for a portrait in a digital image, and the method is applied to an electronic device capable of receiving or reading a digital image and executing a focus enhancing process with respect to a portrait in the digital image, particularly to a front upper portion of a portrait in the digital image. With reference to FIG. 1, the method comprises a foreground definition procedure 20, a foreground and background segmentation procedure 21 and a foreground and background blending procedure 22. The foreground definition procedure 20 adopts a face detection technique to compute a face position in the image, and then adopts a face feature (such as eyes, cheek and jaw, etc) detection technique to locate the position of a face feature according to the face position, and a skin detection technique to correct the face feature according to the detected skin to define a head region, and uses a dimension scale of a body region with respect to the head region to compute a portrait including the head region and the body region, and uses the portrait as a foreground of the digital image. The foreground and background segmentation procedure 21 adopts a graph cutting technique to cut away an image other than the foreground from the digital image, and uses the result as a background of the digital image. The foreground and background blending procedure 22 performs the processes of blurring the background, feathering a transition region coupled to the foreground and the background, such that the transition region has a smoother and more natural image, and blending the foreground, the transition region and the background to form a new digital image with a prominent portrait.

To produce a digital image with clear foreground (such as a portrait) and background, the present invention defines a foreground in the digital image to automatically retrieve the foreground. In a preferred embodiment of the invention, the foreground definition procedure 20 adopts a face detection technique to compute a face position in the image, and the face detection technique is provided for detecting a face as described above, and such algorithms have been disclosed in publications, and the most popular one is a face detector designed according to the Gentle Adaboost (GAB) algorithm, and the face detector uses a Haar-like feature for identifying a face, and trains a required face classifier based on a specific quantity of face image samples, and then uses the face classifier to determine whether or not an image is a face in the digital image, so as to define a face position in the digital image. The face detection technique, the face detector and the face classifier are not the technical characteristics of the present invention, and thus will not be descried here.

Figure 2:
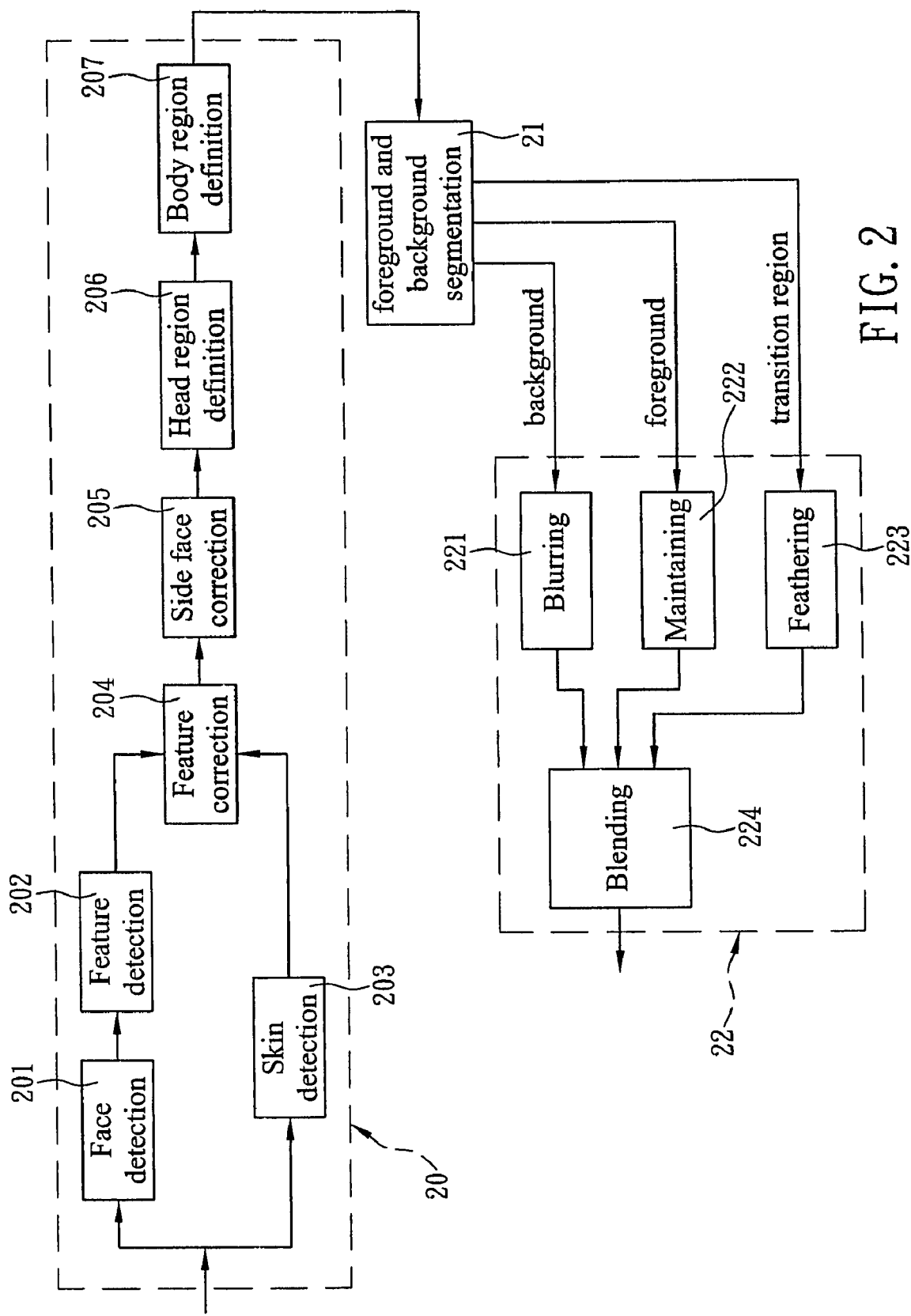
FIG. 2 is a detailed schematic view of the flow chart as depicted in FIG. 1.
Figure 3:
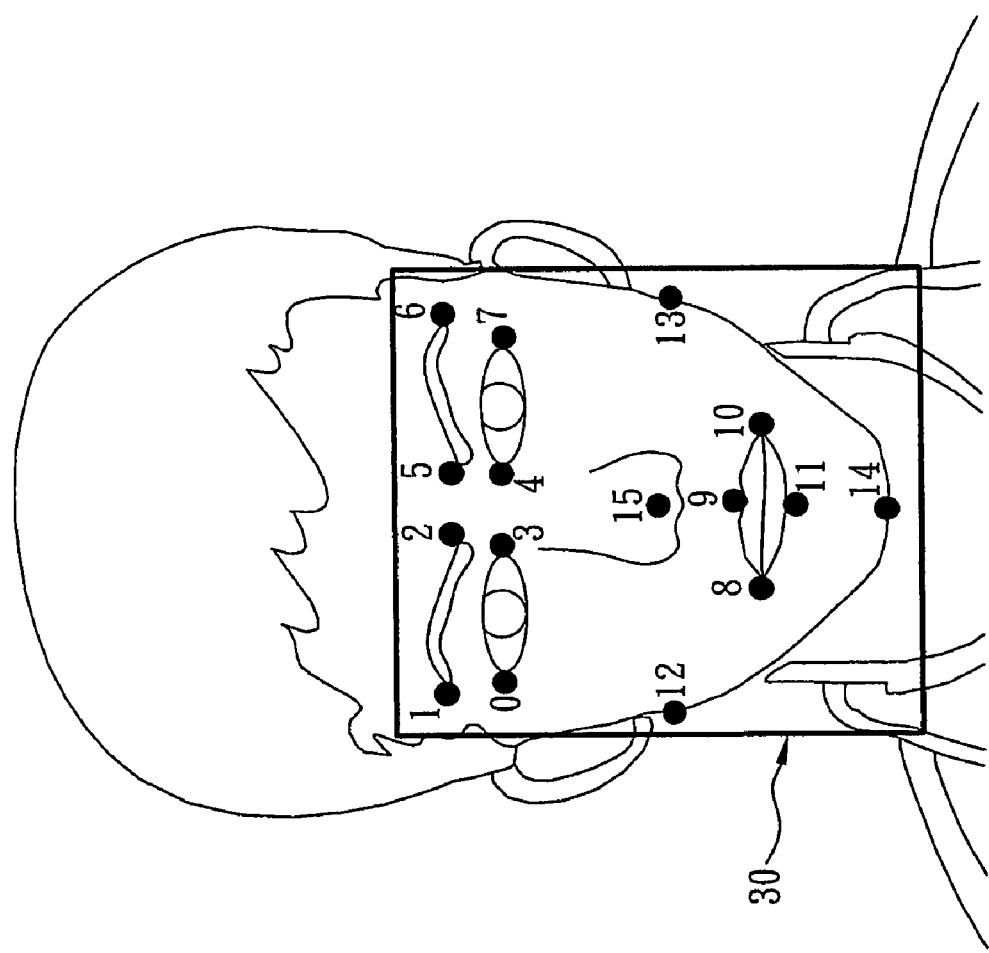
FIG. 3 is a schematic view of a face position and face features marked on a digital image in accordance with the present invention.

With reference to FIG. 2, the face position computed by using the face detection technique 201 corresponds to a rectangular frame 30 of a face. With reference to FIG. 3, the rectangular frame 30 covering five senses of a face is sufficient to show a plurality of features of different facial expressions, but the precision is relatively low, if the rectangular frame 30 is used as the only basic information for defining the position of a portrait. In the preferred embodiment as shown in FIGS. 2 and 3, the foreground definition procedure 20 further requires the feature detection technique 202 to locate the position of a face feature. In the present invention, the so-called "face feature" refers to a plurality of points of the five senses of a face capable of showing different facial expressions, and the quantity and positions of feature points defined on each of the five senses vary according to the actual requirement and the level of complexity. In the preferred embodiment as shown in FIGS. 3, 16, the face features defined on a face position are used for illustrating the present invention as follows:

(1) Four face features defined at eyebrows are two end points 1, 2, 5, 6 on both left and right eyebrows respectively;

(2) Four face features defined at eyes are two end points 0, 3, 4, 7 on left and right eyes respectively;

(3) One face feature defined at a nose is an end point 15 at a nose tip;

(4) Four face features defined at a mouth are four end points 8, 9, 10, 11 distributed equidistantly along the external periphery of lips;

(5) Two face features defined at a cheek are the positions 12, 13 at the periphery of the cheek proximate to the malar bone; and (6) One face feature defined at a chin 14 is an end point of the periphery of the chin.

The feature detection technique 202 adopts the aforementioned face features for the detection, and such algorithms have been disclosed in publications, and the most popular one is an algorithm using Gabor wavelet features to form a Gabor Jet Bunch by using a Gabor Jet for each face feature by using a series of face samples (such as male, female, elderly and youth). As the Gabor wavelet is a product of a trigonometric function and a Gaussian function, and its two dimensional function is expressed in the following form:

$$W(x, y, \theta, \lambda, \varphi, \sigma, \gamma) = e^{-\frac{(x\cos(\theta)+y\sin(\theta))^2+\gamma^2(-x\sin(\theta)+y\cos(\theta))^2}{2\sigma^2}} \cos\left(2\pi \frac{x\cos(\theta)+y\sin(\theta)}{\lambda}+\varphi\right)$$

where, $\theta$ is the direction of the wavelet, $\lambda$ is the wavelength of the wavelet, $\phi$ is the phase of the wavelet, $\sigma$ is the value of the function in the Gaussian function, and $\gamma$ is the aspect ratio of the Gaussian function. In the feature detection technique 202, each face feature of a face sample is collected, and different directions, wavelengths and phases of the Gabor wavelet are computed as follows:

$$S_\phi(J_0, J_i) = \frac{\sum_{j=1}^{N} a_0 a_i \cos(\phi_0 - \phi_i)}{\sqrt{\sum_{j=1}^{N} a_0^2 \sum_{j=1}^{N} a_i^2}}$$

A series of complex numbers are generated, and the complex numbers represent the Gabor Jets of the face features, such that the Gabor Jet of each face feature in a series of face samples (such as male, female, elderly and youth) is collected to form a Gabor Jet Bunch. Therefore, the similarity of Gabor Jets of the face features on two face images is compared, or the similarity of features including direction, wavelength and phase is compared to determine the similarity of the corresponding face feature. It is noteworthy to point out that the algorithm of the Gabor Jet Bunch is a prior art that is not claimed in the invention, and thus will not be described here.

In the preferred embodiment as shown in FIG. 3, when the feature detection technique 202 computes the positions of all face features, a small neighborhood (such as 8×8) of an initial position of each face feature on the rectangular frame 30 is used as a candidate point, and the Gabor Jet of the initial position of all face features on the rectangular frame 30 and each Gabor Jet in the Gabor Jet Bunch are compared, and the candidate point with a specially high similarity of a certain Gabor Jet in the Gabor Jet Bunch is used as the position of a corresponding face feature on the rectangular frame 30, and marked on the rectangular frame 30 accordingly.

Since the feature detection technique 202 has an issue of detecting faces feature of a certain portrait inaccurately, therefore it is necessary to use the skin detection technique 203 for correcting the face features. For example, the aforementioned face features are used for the illustration, and the positions of two face features 12, 13 are used for correcting the positions on a cheek in the foreground definition procedure 20, and the skin detection technique 203 uses the detected positions of the face features 12, 13 as the start points to find the boundary position of a skin, so as to avoid the occurrence of a deviation of the skin detection. In addition, the mean of the boundary positions of several upper and lower rows of skin of the face features 12, 13 is used as the boundary position of the skin to perform a feature correction 204 for the face features in order to correct the positions of two face features 12, 13 on the cheek. Taking the effect of the segmented result on a side face into consideration, the foreground definition procedure 20 further adopts a side face correction technique 205. For example, two face features 12, 13 on the cheek are used for the illustration, and the side face correction technique 205 defines the extent of a side face simply by using the deviation of the distance measured from the corrected positions of the face features 12, 13 to the central positions 9, 11 of the mouth.

Figure 4:
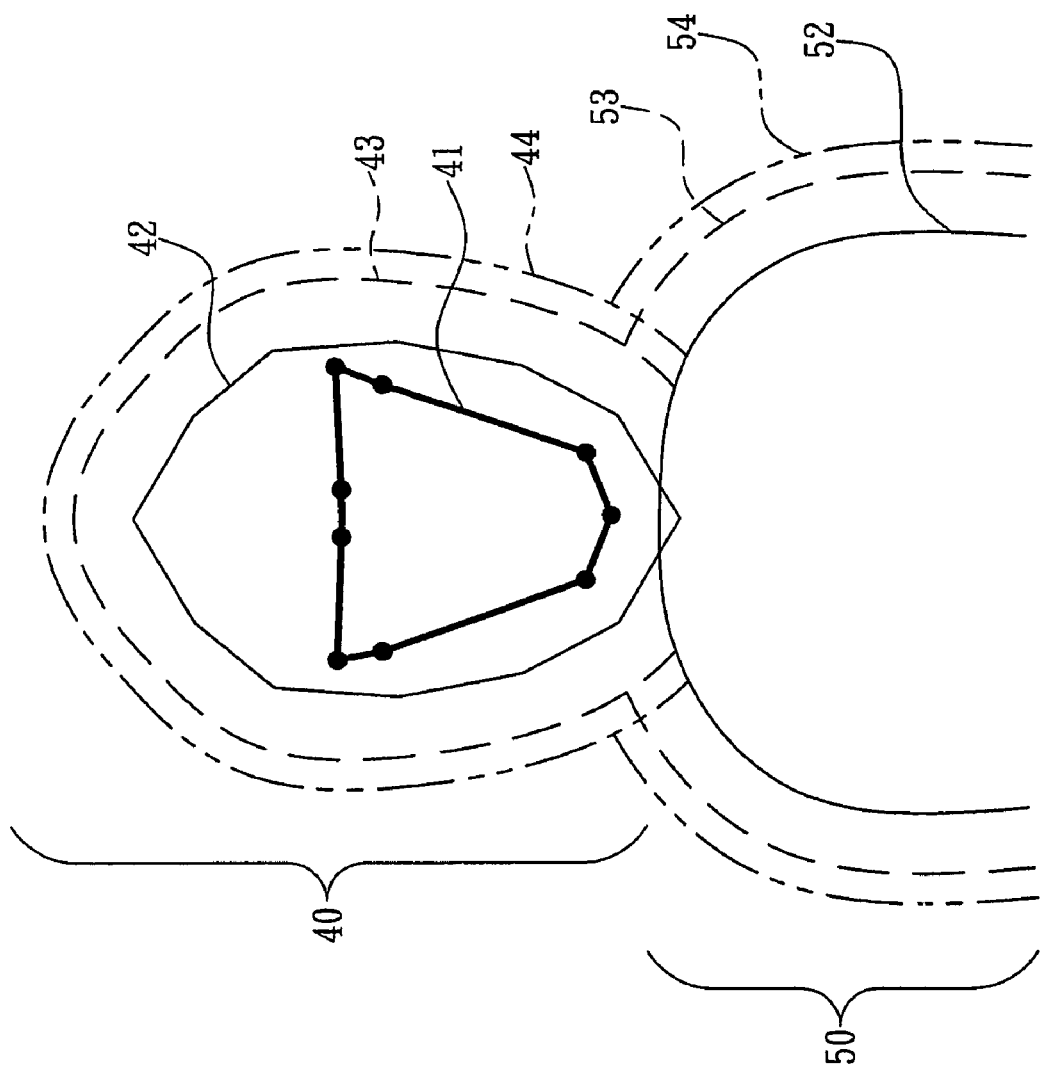
FIG. 4 is a schematic view of a mask of a head region and a body region defined on a digital image in accordance with the present invention.

Since most of the aforementioned face features are centralized at middle and lower portions of a face, and there is no feature point at the position of a forehead or above available for detection, therefore the foreground definition procedure 20 uses the dimension scale between the aforementioned face features and head region to define a plurality of additional feature points and a complete head region in the digital image and a head region mask accordingly. With reference to FIGS. 3 and 4 for a preferred embodiment of the present invention, the head region mask is covered onto a head region (including periphery features of hair, beard or other head regions) with the same depth of field, and the foreground definition procedure 20 further comprises a head region definition procedure 206, and when the head region definition procedure 206 defines the head region 40, the following regions are defined:

(1) a face feature region 41, which is a region necessarily included by the face features in the head region;

(2) a head edge region 42, which is a region tended to be included in the head region and formed by a predetermined dimension scale expanded by the face feature region 41 according to the face feature;

(3) a head transition region 43, which is an unknown region coupled to the head region and the background, and generally a transition region between the head region and the background, and the head region definition procedure 206 expands the head edge region 42 to a predetermined dimension scale, such as ⅓ of the width of the head edge region 42 to define the head transition region 43; and (4) a background edge region 44, which is a region tended to be included in the background, and the head region definition procedure 206 expands the head transition region 43 to a predetermined dimension scale such as ¼ of the head transition region 43 to define the background edge region 44.

Since the portrait in the digital image not only includes a head region, but also includes an upper body as shown in FIGS. 3 and 4, therefore the foreground definition procedure 20 further comprises a body region definition procedure 207, and when the body region definition procedure 207 defines the body region 50, the following regions are specially defined for the definition of a body mask:

(1) a body edge region 52, which is a region tended to be included in the body, and the body region definition procedure 207 bases on a dimension scale between the body and the head region and a range of 1.2 times of the width from the left and right of the middle of the head region to form the body edge region 52 according to the head edge region;

(2) a body transition region 53, which is an unknown region coupled to the body and the background, and generally a transition region between the body and the background, and the body region definition procedure 207 expands the body edge region 52 to a predetermined dimension scale such as 0.4 time of the width of the body edge region 52 to define the body transition region 53; and (3) another background edge region 54, which is a region tended to be included in the background, and the body region definition procedure 207 expands the body transition region 53 to a predetermined dimension scale such as 0.4 time of the width of the body transition region 53 to define the background edge region 54. For a portrait other than the half-length portrait, the body region definition procedure 207 assumes that the maximum length of the body is equal to six times of the height of the head region.

In the preferred embodiment, the definition of the head region is more accurate, and an inaccurate definition of the body with the posture of the portrait such as a posture of extending an arm may occur. To improve the accuracy of the defined body region 50, the present invention further integrates and defines the body region 50 through a rough mask of the inputted portrait, wherein the rough mask can be a 16×16 binary image, and 1 stands for a substantial foreground, and 0 stands for a substantial background, and the rough mask can be generated through the auto focus system of the electronic image capturing device. In other words, the electronic image capturing device will evaluate the contrast of each block (and a digital image is generally divided into 16×16 blocks) of the digital image in an auto focus process and output the contrast value of a series of blocks after the auto focus is completed, and thus the rough mask can be obtained by analyzing the contrast value of the blocks. (Now, we have two ways to improve the accuracy of the definition of foreground, one is a rough mask of the inputted portrait which is mentioned above. The other ways is based on the user interaction, because now more and more touch screen based device appeared, it is very convenient for user to draw a very simple polygon on touch screen to point out the rough framework of foreground as a foreground mask, then we can do the same thing as above to separate the foreground and background.)

After the foreground definition procedure 20 defines a head region 40 and a body region 50 in the digital image, a portrait including the head edge region 42 and the body edge region 52 is obtained, and the portrait is used as a foreground of the digital image for defining a foreground mask accordingly.

In the preferred embodiment, the foreground and background segmentation procedure 21 adopts a powerful graph cutting technique (also known as "Graph cut"), wherein the graph cutting technique considers the segmentation procedure 21 as a binary labeling problem. In other words, if any pixel in the digital image does not belong to the foreground, then the pixel must belong to the background. The basic principle of the graph cutting technique is to process the transparency Lp of a pixel P in the digital image. If the pixel p belongs to a foreground, then the transparency Lp will be set to 1, or else the transparency Lp is set to 0, and the formula (1) for the minimized Gibbs energy E(L) is used for obtaining the transparency Lp of each pixel:

$$E(L)=U(p,Lp)+V(p,Lp) \quad (1)$$

Where, U(p,Lp) stands for the penalty energy of a pixel classification, V(p,Lp) is a smoothing term of a pixel in a region, and indicates the continuity of the current pixel with other pixels in the region, and U(p,Lp) and V(p,Lp) are generally defined by the following formulas (2) and (3) respectively:

$$U(p, Lp) = \lambda \Box \sum_{p \in P} -\ln h(p; Lp) \quad (2)$$

$$V(p, Lp) = \sum_{(p,q) \in N} \frac{e^{-\frac{(Ip-Iq)^2}{2\sigma^2}} \Box |Lp - Lq|}{dist(p, q)} \quad (3)$$

Where, λ stands for a weight coefficient between U(p,Lp) and V(p,Lp), (p,q)∈N indicates that P and q are adjacent pixels, h(p;Lp) shows a color distribution, Ip is the grey scale value of the pixel p, σ is a constant, and dist(p,q) is the Euclidean distance between pixels p and q. The energy in the minimal energy formula (1) can be achieved by the standard minimum cut algorithm, and the color distribution can be achieved by using the following Gaussian Mixture Model (GMM) formula (4), and the GMM is formulated by K Gaussian models:

$$P(\omega | x) = \sum_{k=1}^{K} \alpha_k G(x; \mu_k, \sigma_k) \quad (4)$$

Where, α1 ... αk are weighted values between Gaussian models, $$\sum_{k=1}^{K} \alpha_k = 1,$$

μk and σk are the $k^{th}$ mean and the $k^{th}$ covariance of the Gaussian model respectively, and each parameter of the GMM can be obtained from a K-means clustering method or an EM training algorithm. The graph cutting technique is a prior art which is not a technical characteristic claimed by the present invention, and thus will not be described here.

With reference to FIGS. 2 and 4, the foreground and background segmentation procedure 21 carries out a graph cutting process once to the digital image according to the previously defined head region 40 to obtain an accurate segmentation result of the head edge region 42, and then uses the head edge region 42 to train the GMM of a foreground and the body edge region 42 to train the GMM of a background, so as to constitute the first term of the energy formula (1), and estimate a probability value for determining whether or not a pixel belongs to the foreground or the background. Similarly, the graph cutting process is carried out once to the digital image according to the previously defined body region 50 to obtain a segmentation result of the body edge region 52. Finally, a graph cutting process is carried out for the two segmentation results to improve the accuracy of the segmentation result. With three times of segmentations, the foreground mask of a complete portrait can be obtained, and the region not belonged to the foreground mask is marked as a background of the digital image according to the foreground mask.

In the preferred embodiment as shown in FIGS. 2 and 4, the foreground and background blending procedure 22 adopts a simpler blurring method 221, such as the Gaussian fuzzy computation, to simulate the out-of-focus effect of the background and perform a process 222 for maintaining the foreground, so that the portrait of the foreground becomes more prominent in the out-of-focus background. The foreground and background blending procedure 22 further performs a feathering process 223 to the head region 43 and the body transition region 53 coupled to the foreground and the background, wherein the preferred embodiment uses the foreground (including the head region 42 and the body edge region 52) and the out-of-focus background as a reference, and the Gaussian fuzzy computation to simulate the out-of-focus effect of the head region 43 and the body transition region 53, so that the head region 43 and the pixels in the body transition region (and/or the background edge regions 44, 54) can have a smoother and more natural layer effect between the foreground and the out-of-focus background. Finally, the foreground and background blending procedure 22 performs a blending process 224 to the foreground, and the transition regions 43, 53 (and/or the background edge regions 44, 54) and the out-of-focus background according to the following formula (5) to form a new digital image Cnew with a prominent portrait:

$$C_{new}=\text{mask}*C_{fore}+(255-\text{mask})*C_{back} \quad (5)$$

Where, Cfore stands for the R,G,B channel value of the foreground, and Cback stands for the R,G,B channel value of the background of a digital image C in a RGB color format.

Therefore, users can simulate the effect of different depths of field for the foreground (or a portrait) and the background in a digital image automatically by using the method of the invention without requiring any photography knowledge, capability and experience, so that the generated digital image not only has a clear foreground, but also has a blurred background, to form a new digital image with the clear foreground and the blurred background, so as to produce a focus enhancing effect to the foreground and avoid the unimportant background from spoiling and interfering the visual effect of the foreground, and the invention can fully show the features and significance of the foreground.

While the invention has been described by means of specific embodiments, numerous modifications and variations could be made thereto by those skilled in the art without departing from the scope and spirit of the invention set forth in the claims.

What is claimed is:

1. A focus enhancing method for a portrait in a digital image, comprising:
    a foreground definition procedure, for computing a face position in the digital image by using a face detection technique, locating a detected position of a face feature according to the face position by using a feature detection, correcting the face feature according to the detected skin color by using a skin detection technique to define a head region, computing a portrait including the head region and a body region by using a dimension scale of the body region and the head region, and using the portrait as a foreground of the digital image; wherein the skin detection technique uses the detected position of the face feature as a start point to find a boundary position of a skin, and uses mean value of boundary positions of a plurality of upper and lower rows of the face feature as the boundary position of the skin for correcting the corresponding face feature;
    a foreground and background segmentation procedure, for cutting an image other than the foreground from the digital image by using a graph cutting technique, and using the result as a background of the digital image; and
    a foreground and background blending procedure, for blurring the background, feathering a transition region that couples the foreground and the background, such that the transition region has a smoother and more natural image, and blending the foreground, the transition region and the background to form a new digital image with a prominent portrait.

2. The method of claim 1, wherein the foreground definition procedure further comprises a head region definition procedure, and the head region definition procedure comprises:
    defining a face feature region according to a region covered by the face feature; expanding the face feature region by using a predetermined dimension scale according to a correction result of the face feature to define a head edge region; and
    expanding the head edge region by using a predetermined dimension scale to define a head transition region.

3. The method of claim 2, wherein the foreground definition procedure further comprises a body region definition procedure, and the body region definition procedure comprises:
    defining a body edge region according to the head edge region based on the dimension scale of the body region and the head region;
    defining a body transition region by expanding the body edge region to a predetermined dimension scale; and
    using the head edge region and the body edge region as the foreground, and the head transition region and the body transition region as the transition region between the foreground and the background.

4. The method of claim 3, wherein the foreground and background blending procedure comprises feathering the transition region coupled to the foreground and the background, and using the foreground and the out-of-focus background as a reference to simulate an out-of-focus effect of the transition region by using a Gaussian fuzzy computation, such that the image in the transition region can show a gradient effect between the foreground and the out-of-focus background.

* * * * *